(12) United States Patent
Kim

(10) Patent No.: US 8,279,532 B2
(45) Date of Patent: Oct. 2, 2012

(54) ZOOM LENS SYSTEM AND IMAGING APPARATUS INCLUDING THE SAME

(75) Inventor: Dong-woo Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 204 days.

(21) Appl. No.: 12/878,179

(22) Filed: Sep. 9, 2010

(65) Prior Publication Data

US 2011/0058260 A1  Mar. 10, 2011

(30) Foreign Application Priority Data

Sep. 9, 2009  (KR) .................. 10-2009-0085074

(51) Int. Cl.
*G02B 15/14* (2006.01)
(52) U.S. Cl. ........................ 359/689; 359/676
(58) Field of Classification Search .......... 359/676, 359/682, 684, 689, 716
See application file for complete search history.

(56) References Cited

U.S. PATENT DOCUMENTS

2002/0044362 A1*  4/2002  Watanabe et al. ............. 359/689

FOREIGN PATENT DOCUMENTS

| JP | 2006-113554 A | 4/2006 |
| JP | 2007-256325 A | 10/2007 |
| JP | 2008-298924 A | 12/2008 |

* cited by examiner

*Primary Examiner* — Alicia I M Harrington
(74) *Attorney, Agent, or Firm* — Drinker Biddle & Reath LLP

(57) ABSTRACT

A zoom lens system includes a first lens group having a negative refractive power, a second lens group having a positive refractive power, and a third lens group having a positive refractive power, wherein the first through third lens groups are arranged sequentially from an object side. When the zoom lens system is zoomed from a wide angle position to a telephoto position, an interval between the first lens group and the second lens group decreases and an interval between the second lens group and the third lens group increases. The first lens group comprises three lenses. An imaging apparatus includes the zoom lens system.

19 Claims, 13 Drawing Sheets

ZOOM LENS SYSTEM AND IMAGING APPARATUS INCLUDING THE SAME

CROSS-REFERENCE TO RELATED PATENT APPLICATION

This application claims the priority benefit of Korean Patent Application No. 10-2009-0085074, filed on Sep. 9, 2009, in the Korean Intellectual Property Office, the disclosure of which is incorporated herein in its entirety by reference.

BACKGROUND

1. Field of the Invention

Embodiments relate to a small sized and inexpensive high-power zoom lens system and an imaging apparatus including the same.

2. Description of the Related Art

Recently, digital cameras or video cameras having solid state imaging devices, such as charge coupled devices (CCDs) and complementary metal oxide semiconductors (CMOSs), are becoming popular. Especially, due to demands for megapixel camera modules, inexpensive cameras with over 5 million pixels for providing high quality images are being released. Imaging optics apparatuses using CCDs or CMOSs, such as digital cameras or cameras of cellular phones, are being developed to be smaller, to be lighter, and have lower costs.

A retracting barrel of a camera, which expands to a predetermined position when an image is to be captured and collapses into the camera when an image is not to be captured, is widely used for size reduction. In a camera having a retracting barrel, it is necessary to minimize intervals between lenses when the barrel is retracted to reduce the thickness of the camera in order to improve portability. As a result, it is desired to reduce a number of lenses for size reduction. However, it is difficult to secure excellent optical performance in response to greater number of pixels when the number of lenses is reduced.

Therefore, a zoom lens including three lens groups is widely used to satisfy the requirements described above. An example of a zoom lens system having a variable magnification capable of 2× magnification or more (and including a small imaging lens system for use in capturing an image) may be a zoom lens system including a first lens group having a negative refractive power, a second lens group having a positive refractive power overall, and a third lens group having a positive refractive power, wherein the first through third lens groups are arranged sequentially from an object side and magnification is changed by adjusting intervals between each of the lens groups. However, it is difficult to fulfill size reduction and cost reduction simultaneously while being able to realize a high magnification index.

SUMMARY

Embodiments include a small sized and inexpensive high-power zoom lens system.

Embodiments also include an imaging apparatus having a small sized and inexpensive high-power zoom lens system.

According to an embodiment, a zoom lens system includes a first lens group having a negative refractive power, a second lens group having a positive refractive power, and a third lens group having a positive refractive power, wherein the first, second, and third lens groups are arranged sequentially from an object side. When the zoom lens system is zoomed from a wide angle position to a telephoto position, an interval between the first lens group and the second lens group decreases and an interval between the second lens group and the third lens group increases. The first lens group includes a first lens, a second lens, and a third lens arranged sequentially from the object side. The zoom lens system satisfies the following expression:

$$0.25 \leq (fw \times N2)/ft \ 0.34,$$

wherein fw indicates a focal length of a zoom lens system at a wide angle position, ft indicates a focal length of the zoom lens system at the telephoto position, and N2 indicates a refractive index of the second lens of the first lens group.

The zoom lens system may satisfy the following expressions:

$$4.6 \leq ft/fw \leq 5.4, \text{ and}$$

$$1.4 \leq N2 \leq 1.6.$$

The zoom lens system may satisfy the following expression:

$$F2 \leq -100,$$

where F2 indicates a refractive power of the second lens of the first lens group.

The first lens of the first lens group may be a spherical lens.

The second lens of the first lens group may be an aspherical lens.

The first lens may have a meniscus shape, may be convex toward the object side, and may have a negative refractive power. The second lens may have a meniscus shape, may be convex toward the object side, and may have a negative refractive power. The third lens may have a meniscus shape, may be convex toward the object side, and may have a positive refractive power.

A lens arranged first from the object side of the second lens group may be an aspherical lens.

The second lens group may include a doublet lens.

A stop may be disposed on an image side of the second lens group.

The third lens group may include only one lens.

The one lens of the third lens group may have a meniscus shape and be convex toward an image side of the third lens group.

The third lens group may include an aspherical lens having a refractive index less than or equal to 1.55.

The third lens group may perform focusing according to movement of an image plane.

According to another embodiment, an imaging apparatus includes a zoom lens system including a first lens group having a negative refractive power, a second lens group having a positive refractive power, and a third lens group having a positive refractive power; and an imaging device that receives light directed through the zoom lens system. The first, second, and third lens groups are arranged sequentially from an object side. When zooming from a wide angle position to a telephoto position, an interval between the first lens group and the second lens group decreases and an interval between the second lens group and the third lens group increases. The first lens group includes a first lens, a second lens, and a third lens arranged sequentially from the object side. The zoom lens satisfies the following expression:

$$0.25 \leq (fw \times N2)/ft \ 0.34,$$

wherein fw indicates a focal length of the zoom lens system at the wide angle position, ft indicates a focal length of the zoom lens system at the telephoto position, and N2 indicates the refractive index of the second lens of the first lens group.

BRIEF DESCRIPTION OF THE DRAWINGS

The above and other features and advantages will become more apparent by describing in detail exemplary embodiments with reference to the attached drawings in which.

DETAILED DESCRIPTION

A zoom lens system according to an embodiment includes a first lens group having a negative refractive power, a second lens group having a positive refractive power, and a third lens group having a positive refractive power, wherein the first through third lens groups are arranged sequentially from an object side. When zooming from a wide angle position to a telephoto position, an interval between the first lens group and the second lens group decreases and an interval between the second lens group and the third lens group increases. In a zoom lens system according to an embodiment, all of the first through third lens groups may be moved during zooming operations. The third lens group may perform focusing according to movement of an image field.

Figure 1:
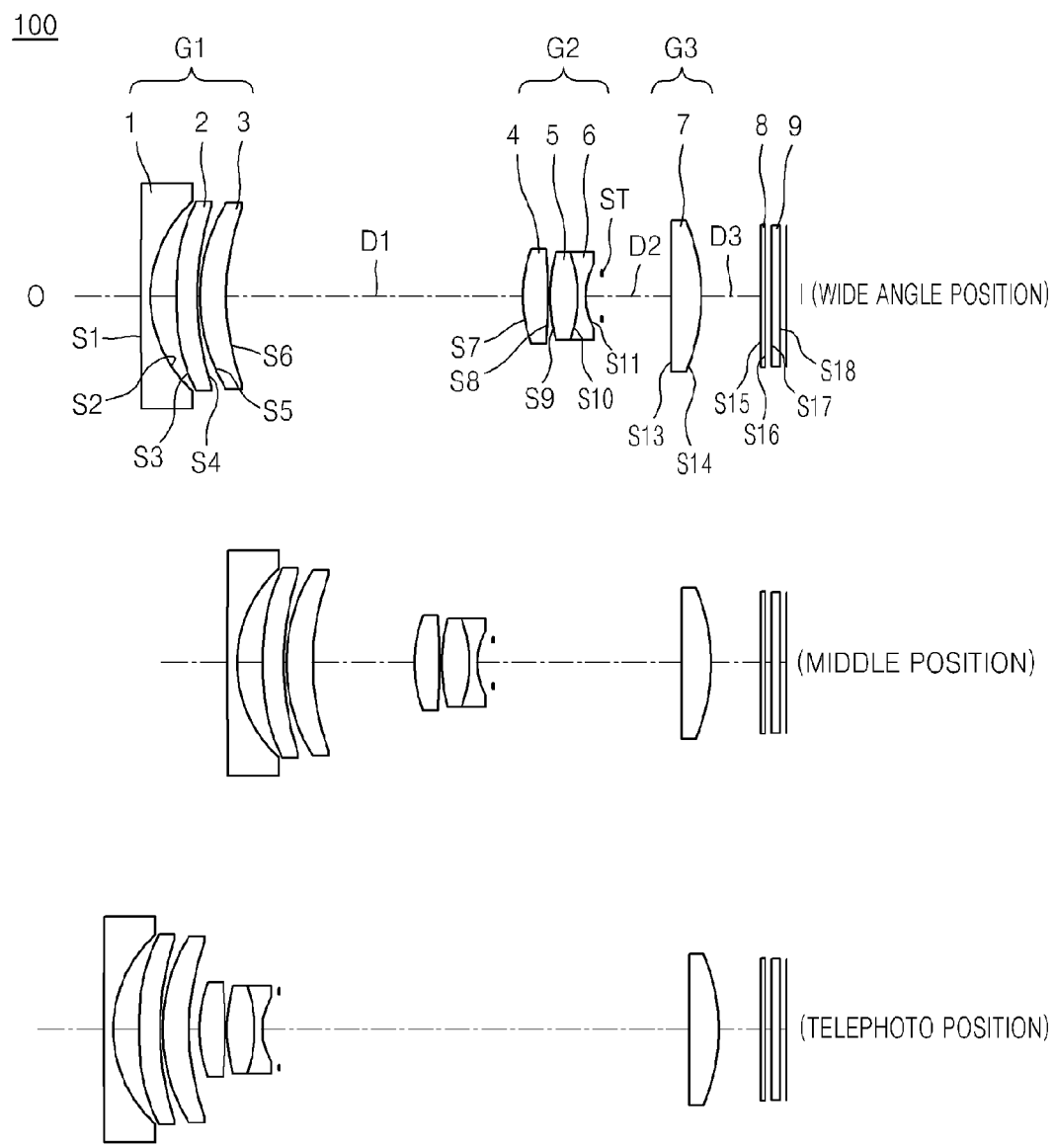
FIG. 1 is a diagram showing a zoom lens system according to a first embodiment.

FIG. 1 is a diagram showing a zoom lens system according to a first embodiment. The zoom lens system includes a first lens group G1 having a negative refractive power, a second lens group G2 having a positive refractive power, and a third lens group G3 having a positive refractive power. The first lens group G1 may include three lenses. For example, the first lens group G1 may include a first lens 1, which has a meniscus shape, is convex toward an object side O, and has a negative refractive power; a second lens 2, which has a meniscus shape, is convex toward the object side O, and has a negative refractive power; and a third lens 3, which has a meniscus shape, is convex toward the object side O, and has a positive refractive power, wherein the first through third lenses are arranged sequentially from the object side O. The first lens group G1 may include two spherical lenses and one aspherical lens. For example, the first lens 1 may be a spherical lens, the second lens 2 may be an aspherical lens, and the third lens 3 may be a spherical lens. The second lens 2 may be an aspherical lens having a low refractive index, and may be formed of a plastic.

When the first lens 1 is an aspherical lens, it may be easy to correct aberration. However, since the first lens group G1 has the greatest outer diameter among the first, second, and third lens groups, cost of fabrication increases by using an aspherical lens as the first lens 1. Furthermore, since there is a limit in reducing a thickness of an aspherical lens, it is difficult to design a slim lens system. If a spherical lens is used as the first lens 1 having the greatest outer diameter, cost of fabrication may therefore be reduced, and, if an inexpensive plastic aspherical lens is used as the second lens 2, aberration may be easily corrected.

A zoom lens system according to an embodiment may satisfy an Expression 1 described below.

$$0.25 \leq (fw \times N2)/ft \leq 0.34 \qquad \text{[Expression 1]}$$

Here, fw indicates a focal length of the zoom lens system at a wide angle position, ft indicates the focal length of the zoom lens system at a telephoto position, and N2 indicates a refractive index of a second lens in a first lens group from an object. The refractive index may be the refractive index of the second lens at the wavelength of the d-line (587.56 nm). When a result value of the Expression 1 exceeds the upper limit, the refractive power of an aspherical lens in the first lens group is increased. As a result, it becomes difficult to use an inexpensive aspherical lens (e.g. a plastic aspherical lens) or it becomes difficult for the entire lens system to have a magnification equal to or greater than 4.5×. If a result value of the Expression 1 is less than the lower limit, though the zoom lens system may have a high magnification, chromatic aberrations of the lens system are increased at the telephoto position, and thus it becomes difficult to improve performance of the zoom lens system.

For example, a zoom lens system according to the embodiments may be configured to satisfy Expressions 2 and 3 described below.

$$4.6 \leq ft/fw \leq 5.4 \qquad \text{[Expression 2]}$$

$$1.4 \leq N2 \leq 1.6 \qquad \text{[Expression 3]}$$

An aspherical lens of a first lens group G1 may be formed of a plastic so that the aspherical lens may have a low refractive index, and thus cost of fabrication may be reduced. Meanwhile, distortion may be corrected by using software.

The first lens group G1 may satisfy an Expression 4 described below.

$$F2 \leq -100 \qquad \text{[Expression 4]}$$

Here, F2 indicates the refractive power of a second lens 2 arranged secondly from an object side of the first lens group. When the second lens 2 satisfies the Expression 4 described above, if an inexpensive plastic lens is used as the second lens 2, variations in focal length due to variations of temperature, which may occur in plastic lenses, may be minimized.

The second lens group G2 may include three lenses. For example, the second lens group G2 may include a fourth lens 4 having a positive refractive power, a fifth lens 5 having a positive refractive power, and a sixth lens 6, having a negative refractive power. The fourth lens 4 may be a an aspherical lens, which reduces spherical aberration. For example, the fourth lens 4 may be a convex aspherical lens. The fifth lens 5 and the sixth lens 6 may form a doublet lens, which reduces lateral chromatic aberrations during zooming operations. A stop ST may be disposed on an image side I of the second lens group G2. During zooming operations, the interval between the second lens group G2 and the third lens group G3 increases, and thus there is sufficient space for disposing the stop ST on the image side I of the second lens group G2. Furthermore, since there is no stop between the first lens group and the second lens group, the interval between the first lens group G1 and the second lens group G2 may be minimized, and thus size of the zoom lens system may be reduced.

The third lens group G3 may include one or more lenses. For example, the third lens group G3 may include one lens 7. The lens 7 may have a meniscus shape and may be convex toward the image side I. For example, the lens 7 may be a plastic aspherical lens having a refractive index less than or equal to 1.55. When using a plastic aspherical lens having a refractive index smaller than or equal to 1.55, the zoom lens system may be fabricated at a reduced cost and without an increase in the angle of light incidence. Alternatively, the lens 7 may be a spherical lens having a refractive index equal to or greater than 1.7. When using a highly-refractive spherical lens having a refractive index equal to or greater than 1.7, aberration may be easily corrected. First and second filters 8 and 9 may be disposed on an image side I of the third lens group G3.

The term "aspherical" used in the descriptions of the embodiments herein is defined as described below.

The aspherical shape of a zoom lens according to an embodiment may be defined as shown in an Expression 5 described below, wherein an optical axis is referred to as an x-axis and an axis perpendicular to the optical axis is referred to as a y-axis. Here, x indicates distance from the vertex of a lens along the optical axis, y indicates the distance in the direction perpendicular to the optical axis direction, K indicates a conic constant, A, B, C, and D indicate aspherical coefficient, and c indicates the inverse of radius of curvature (1/R) at the vertex of the lens.

$$x = \frac{cy^2}{1 + \sqrt{1 - (k+1)c^2 y^2}} + Ay^4 + By^6 + Cy^8 + Dy^{10} \quad \text{[Expression 5]}$$

As will be described below, zoom lens systems of various designs are embodied.

Hereinafter, f indicates a synthetic focal length of the zoom lens system, Fno indicates an F number, 2ω indicates an angle of view, R indicates a radius of curvature, Dn indicates either center thickness of a lens or interval between lenses, Nd indicates a refractive index, Vd indicates an Abbe number, and S1-S18 represent lens surfaces in an order from the object side to the image side along the optical axis. Additionally, ST indicates a stop, D1, D2, and D3 indicate varied distances, and ASP indicates an aspherical surface. Furthermore, lenses forming each of lens groups G1, G2, and G3 are indicated by using the same reference numbers in drawings illustrating each of the first, second, third, and fourth embodiments. Elements having the same reference numbers in drawings illustrating different embodiments may be distinct from and dissimilar to one another. For example, the lens 7 in the third lens group G3 of the third embodiment has different schematic data than the lens 7 in the third lens group G3 of the fourth embodiment, although the same reference numbers are used for the elements in drawings illustrating the second embodiment and the third embodiment.

First Embodiment

FIG. 1 illustrates wide angle position, middle position, and telephoto position configurations of a zoom lens system according to the first embodiment. Schematic data of the zoom lens system according to the first embodiment is given below in Table 1.

TABLE 1

| | f: 4.83~10.79~22.95 | | | |
| | Fno: 3.61~5.74~6.07 | | | |
| | 2ω: 77.45~39.51~19.16 | | | |
| Lens Surface | R (Radius of Curvature) | Dn (Thickness) | Nd | Vd |
| --- | --- | --- | --- | --- |
| OBJ: | INFINITY | INFINITY | | |
| S1: | 146.325 | 0.550008 | 1.834810 | 42.72 |
| S2: | 7.219 | 1.711200 | | |
| S3: | 15.18401 ASP: | 1.000000 | 1.531200 | 56.51 |
| | K: 2.336867 A: −.541032E−03 | B: 0.389622E−04 | C: −.501044E−06 | D: 0.900976E−08 |
| S4: | 13.89981 ASP: | 0.100000 | | |
| | K: 1.284154 A: −.592427E−03 | B: 0.377363E−04 | C: −.548917E−06 | D: 0.113721E−07 |
| S5: | 9.00602 | 1.510291 | 1.945945 | 17.9843 |
| S6: | 12.25809 | D1 | | |
| S7: | 6.38708 ASP: | 1.528616 | 1.689970 | 49.0000 |
| | K: −4.383997 A: 0.119854E−02 | B: −.779258E−04 | C: 0.694829E−06 | D: −.279409E−06 |
| S8: | −44.77766 ASP: | 0.100000 | | |
| | K: 84.649616 A: .305905E−03 | B: .103149E−04 | C: 0.785226E−06 | D: −.211495E−06 |

TABLE 1-continued f: 4.83~10.79~22.95
Fno: 3.61~5.74~6.07
2ω: 77.45~39.51~19.16

| Lens Surface | R (Radius of Curvature) | Dn (Thickness) | Nd | Vd |
|---|---|---|---|---|
| S9: | 9.59339 | 1.525394 | 1.883000 | 40.8054 |
| S10: | −5.71047 | 0.400000 | 1.698950 | 30.0505 |
| S11: | 3.71327 | 0.830000 | | |
| ST: | INFINITY | D2 | | |
| S13: | −167.04396<br>ASP: | 1.744459 | 1.531200 | 56.5100 |
| | K: 650.828230<br>A: −.184478E−03 | B: −.208212E−05 | C: 0.153067E−05 | D: 0.216338E−07 |
| S14: | −8.68225<br>ASP: | D3 | | |
| | K: −0.314373<br>A: 0.553998E−03 | B: −.212087E−04 | C: 0.106704E−05 | D: 0.712036E−07 |
| S15: | INFINITY | 0.300000 | 1.516798 | 64.1983 |
| S16: | INFINITY | 0.300000 | | |
| S17: | INFINITY | 0.500000 | 1.516798 | 64.1983 |
| S18: | INFINITY | 0.599994 | | |
| IMG: | INFINITY | | | |

Table 2 shows data regarding distances varied during zooming operations of the zoom lens system according to the first embodiment.

TABLE 2

| | Wide angle position | Middle position | Telephoto position |
|---|---|---|---|
| D1 | 15.7601 | 5.4097 | 0.8 |
| D2 | 3.9873 | 10.6603 | 23.0339 |
| D3 | 2.9398 | 2.4962 | 2.1026 |

Figure 2A:
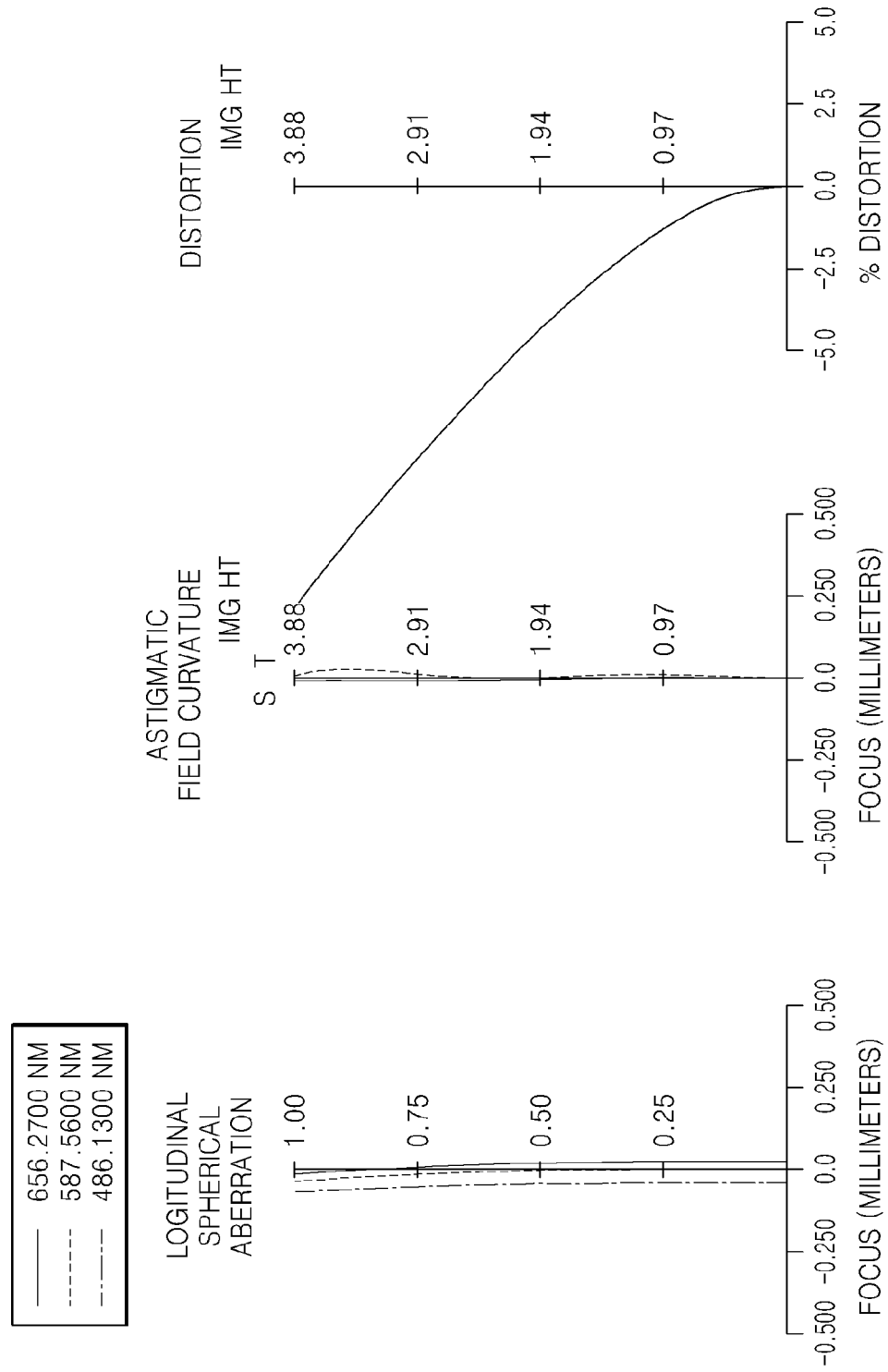
FIGS. 2A and 2B are diagrams showing spherical aberrations, astigmatic field curvatures, and distortion aberrations of a zoom lens system according to the first embodiment of FIG. 1 at a wide angle position and at a telephoto position, respectively.
Figure 2B:
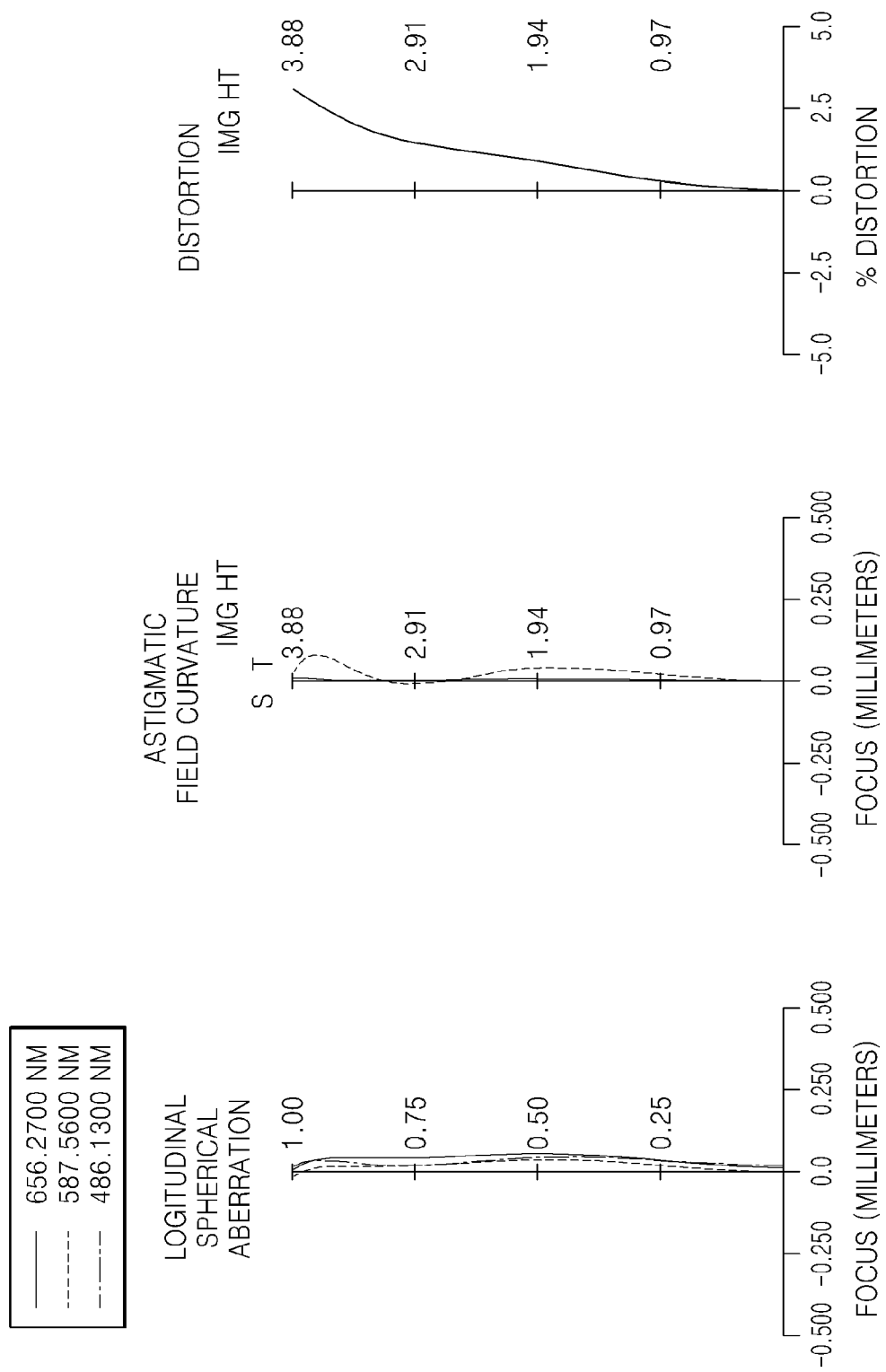

FIGS. 2A and 2B are diagrams showing spherical aberrations, astigmatic field curvatures, and distortion aberrations of a zoom lens system according to the first embodiment of FIG. 1 at a wide angle position and at a telephoto position, respectively. The spherical aberrations are shown with respect to c-line, d-line, and f-line, where wavelength of the c-line is 656.3 nm, wavelength of the d-line is 587.6 nm, and wavelength of the f-line is 486.1 nm. For the astigmatic field curvatures, tangential field curves T and sagittal field curves S are shown. In the diagrams of the distortion aberrations, the vertical axis indicates the maximum height HT of an image.

Second Embodiment

Figure 3:
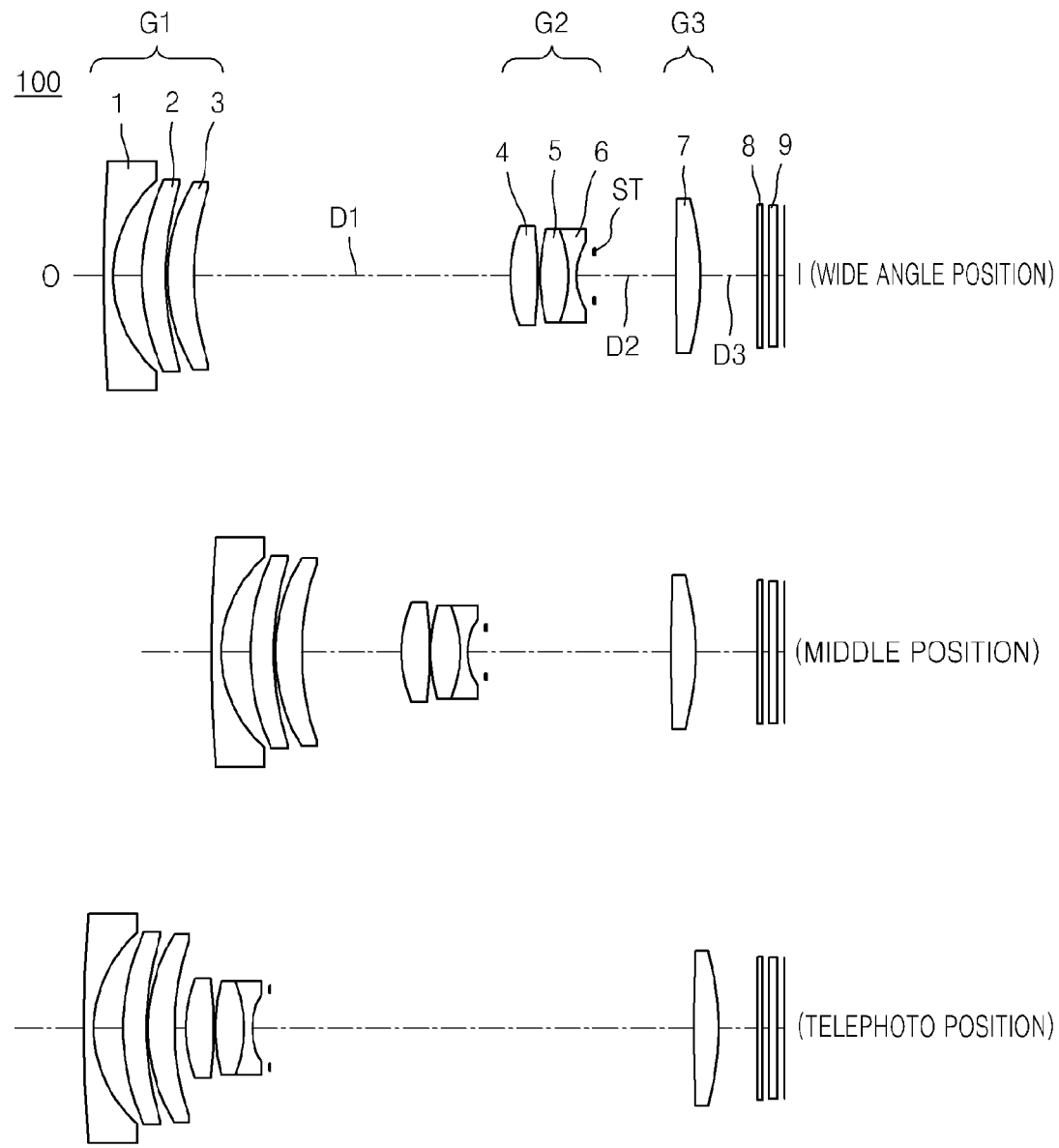
FIG. 3 is a diagram showing a zoom lens system according to a second embodiment.

FIG. 3 is a diagram showing a zoom lens system according to a second embodiment. Schematic data of the zoom lens system according to the second embodiment is given below in Table 3.

TABLE 3 f: 5.00~11.05~23.30
Fno: 3.55~5.65~5.95
2ω: 75.55~38.64~18.88

| Lens Surface | R (Radius of Curvature) | Dn (Thickness) | Nd | Vd |
|---|---|---|---|---|
| OBJ | INFINITY | INFINITY | | |
| S1: | 900.00000 | 0.550000 | 1.823868 | 44.9988 |
| S2: | 7.00667 | 1.738857 | 1.51358 | 51.54 |
| S3: | 11.25733<br>ASP: | 1.000000 | 1.45830 | 30.5100 |
| | K: −0.747677<br>A: −0.801049E−03 | B: 0.281353E−04 | C: −0.312632E−06 | D: 0.151216E−07 |
| S4: | 9.24786<br>ASP: | 0.300000 | | |
| | K: 1.314027<br>A: −.135625E−02 | B: 0.269031E−04 | C: 0.598477E−06 | D: 0.124753E−07 |
| S5: | 10.75501 | 1.566091 | 1.945945 | 17.9843 |
| S6: | 19.33745 | D1 | | |
| S7: | 6.56537<br>ASP: | 1.674645 | 1.675203 | 50.4243 |
| | K: −4.327212<br>A: 0.122099E−02 | B: −.658906E−04 | C: 0.209007E−05 | D: −.492565E−07 |
| S8: | −26.80247 | 0.100000 | | |

TABLE 3-continued f: 5.00~11.05~23.30
Fno: 3.55~5.65~5.95
2ω: 75.55~38.64~18.88

| Lens Surface | R (Radius of Curvature) | Dn (Thickness) | Nd | Vd |
|---|---|---|---|---|
| | ASP: | | | |
| | K: 53.132776 | | | |
| | A: 0.601125E−03 | B: 0.159699E−04 | C: −.115587E−05 | D: 0.211871E−06 |
| S9: | 10.10752 | 1.604490 | 1.849776 | 31.0048 |
| S10: | −5.93566 | 0.580832 | 1.714287 | 24.1988 |
| S11: | 3.87211 | 0.830000 | | |
| ST: | INFINITY | D2 | | |
| S13: | −35.19643 | 2.055084 | 1.458300 | 30.5100 |
| S14: | −6.88634 | D3 | | |
| | ASP: | | | |
| | K: 0.207806 | | | |
| | A: 0.111695E−02 | B: 0.260985E−05 | C: 0.000000E+00 | D: 0.000000E+00 |
| S15: | INFINITY | 0.300000 | 1.516798 | 64.1983 |
| S16: | INFINITY | 0.300000 | | |
| S17: | INFINITY | 0.500000 | 1.516798 | 64.1983 |
| S18: | INFINITY | 0.599976 | | |
| IMG: | INFINITY | | | |

Table 4 shows data regarding distances varied during zooming operations of the zoom lens system according to the second embodiment.

TABLE 4

| | Wide angle position | Middle position | Telephoto position |
|---|---|---|---|
| D1 | 16.1196 | 5.5447 | 0.8 |
| D2 | 3.9873 | 10.6603 | 23.0339 |
| D3 | 2.9398 | 2.4962 | 2.1026 |

Figure 4A:
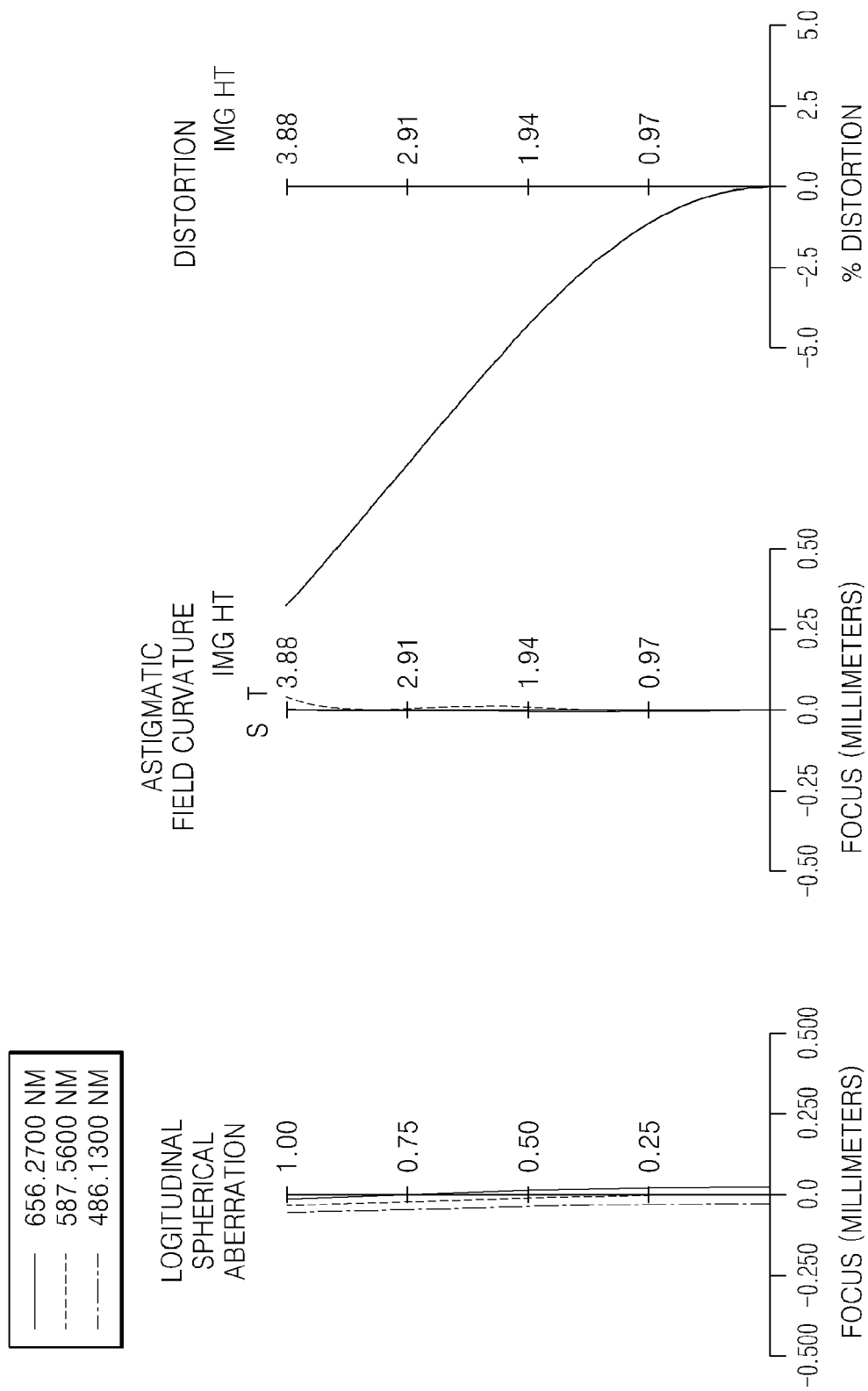
FIGS. 4A and 4B are diagrams showing spherical aberrations, astigmatic field curvatures, and distortion aberrations of a zoom lens system according to the second embodiment of FIG. 3 at a wide angle position and at a telephoto position, respectively.
Figure 4B:
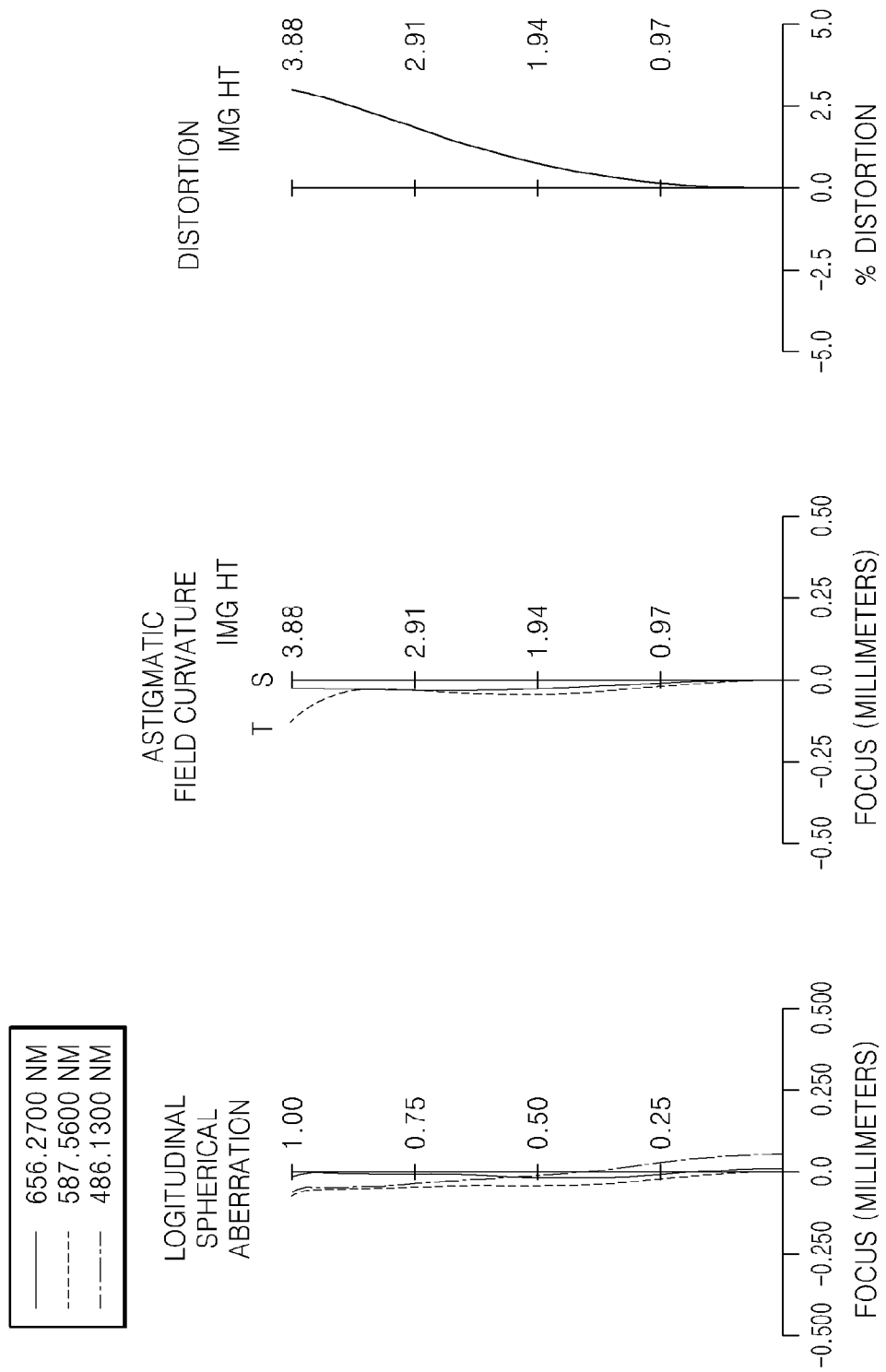

FIGS. 4A and 4B are diagrams showing spherical aberrations, astigmatic field curvatures, and distortion aberrations of a zoom lens system according to the second embodiment of FIG. 3 at a wide angle position and at a telephoto position, respectively.

Third Embodiment

Figure 5:
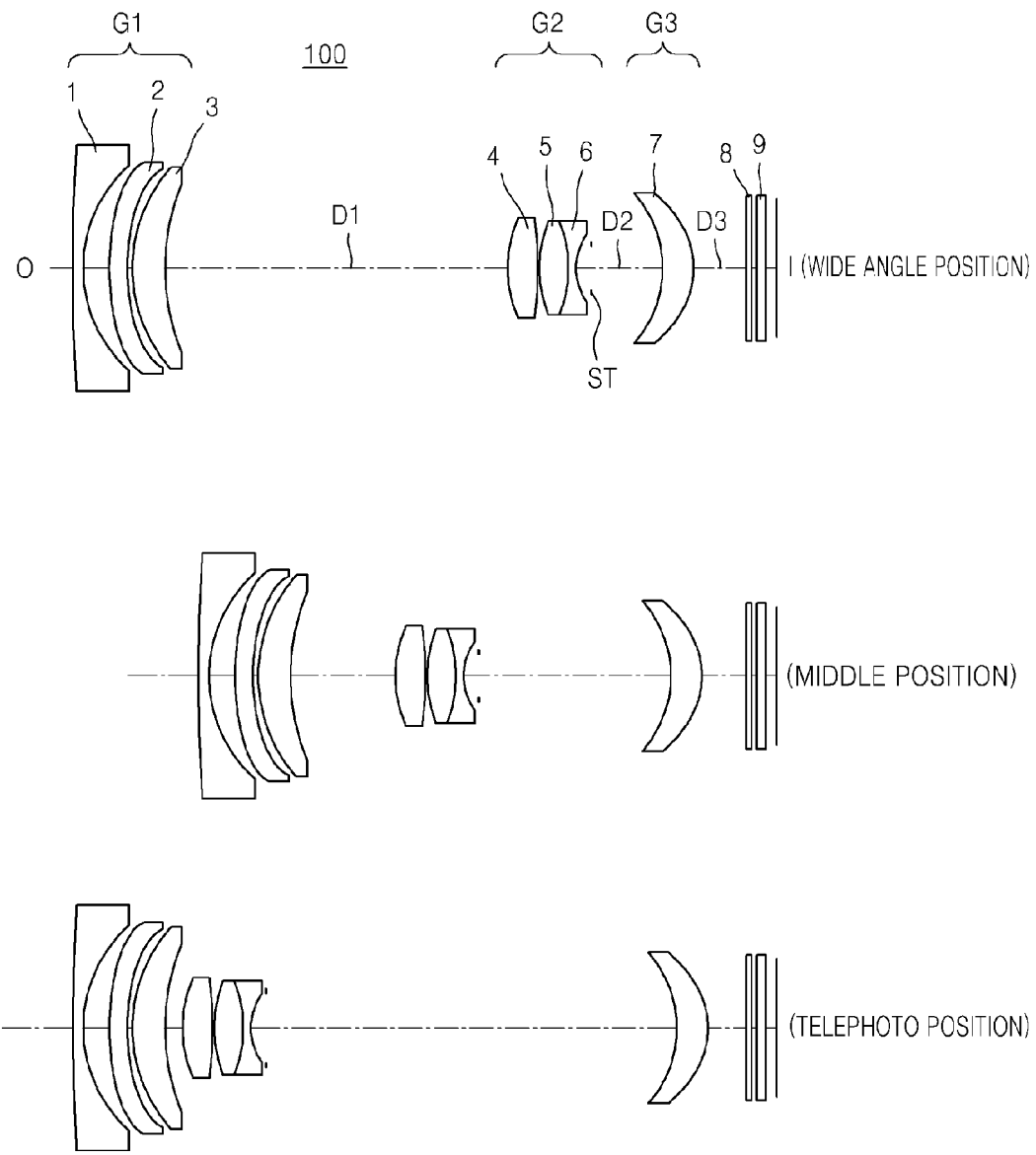
FIG. 5 is a diagram showing a zoom lens system according to a third embodiment.

FIG. 5 is a diagram showing a zoom lens system according to a third embodiment. Schematic data of the zoom lens system according to the third embodiment is given below in Table 5.

TABLE 5 f: 4.88~12.02~26.33
Fno: 3.48~5.78~6.32
2ω: 76.94~35.74~16.74

| Lens Surface | R (Radius of Curvature) | Dn (Thickness) | Nd | Vd |
|---|---|---|---|---|
| OBJ: | INFINITY | INFINITY | | |
| S1: | 109.33971 | 0.550000 | 1.883000 | 40.8054 |
| S2: | 7.62686 | 1.472504 | | |
| S3: | 12.28477 | 1.000000 | 1.458300 | 30.5100 |
| | ASP: | | | |
| | K: −1.207698 | | | |
| | A: −.846481E−03 | B: 0.372960E−04 | C: −.350234E−06 | D: 0.106895E−07 |
| S4: | 9.97510 | 0.300000 | | |
| | ASP: | | | |
| | K: 1.608288 | | | |
| | A: −.112729E−02 | B: 0.410665E−04 | C: −.897712E−06 | D: 0.187096E−07 |
| S5: | 8.62015 | 1.769258 | 1.945945 | 17.9843 |
| S6: | 12.50327 | D1 | | |
| S7: | 6.53827 | 1.651991 | 1.662609 | 57.9040 |
| | ASP: | | | |
| | K: −4.29887 | | | |
| | A: 0.126834E−02 | B: 0.648885E−04 | C: 0.113978E−05 | D: −.602728E−07 |
| S8: | −26.93776 | 0.100000 | | |
| | ASP: | | | |
| | K: 55.216866 | | | |
| | A: 0.429164E−03 | B: 0.802997E−05 | C: −.146537E−05 | D: 0.184038E−06 |

TABLE 5-continued f: 4.88~12.02~26.33
Fno: 3.48~5.78~6.32
2ω: 76.94~35.74~16.74

| Lens Surface | R (Radius of Curvature) | Dn (Thickness) | Nd | Vd |
|---|---|---|---|---|
| S9: | 7.30898 | 1.585154 | 1.814111 | 45.8419 |
| S10: | −6.93609 | 0.440276 | 1.730178 | 32.8554 |
| S11: | 3.56661 | 0.830000 | | |
| ST: | INFINITY | D2 | | |
| S13: | −6.34666 | 1.677619 | 1.458300 | 30.5100 |
| S14: | −3.93761 ASP: | D3 | | |
| | K: −0.656311 A: 0.143407E−02 | B: −.175285E−04 | C: 0.000000E+00 | D: 0.000000E+00 |
| S15: | INFINITY | 0.300000 | 1.516798 | 64.1983 |
| S16: | INFINITY | 0.300000 | | |
| S17: | INFINITY | 0.500000 | 1.516798 | 64.1983 |
| S18: | INFINITY | 0.600010 | | |
| IMG: | INFINITY | | | |

Table 6 shows data regarding distances varied during zooming operations of the zoom lens system according to the third embodiment.

TABLE 6

| | Wide angle position | Middle position | Telephoto position |
|---|---|---|---|
| D1 | 19.0141 | 5.8264 | 0.8 |
| D2 | 3.9873 | 10.6603 | 23.0339 |
| D3 | 2.9398 | 2.4962 | 2.1026 |

Figure 6A:
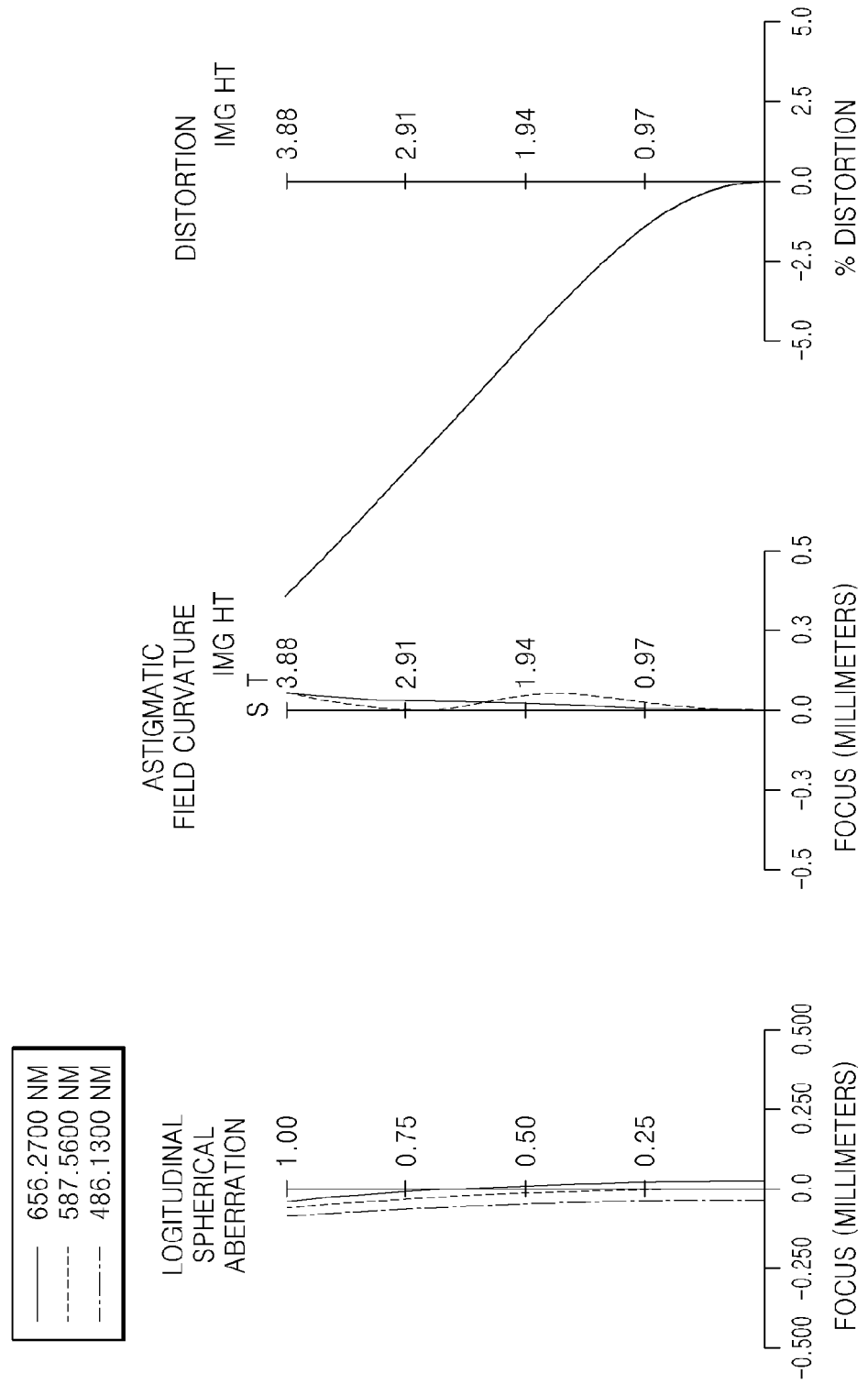
FIGS. 6A and 6B are diagrams showing spherical aberrations, astigmatic field curvatures, and distortion aberrations of a zoom lens system according to the third embodiment of FIG. 5 at a wide angle position and at a telephoto position, respectively.
Figure 6B:
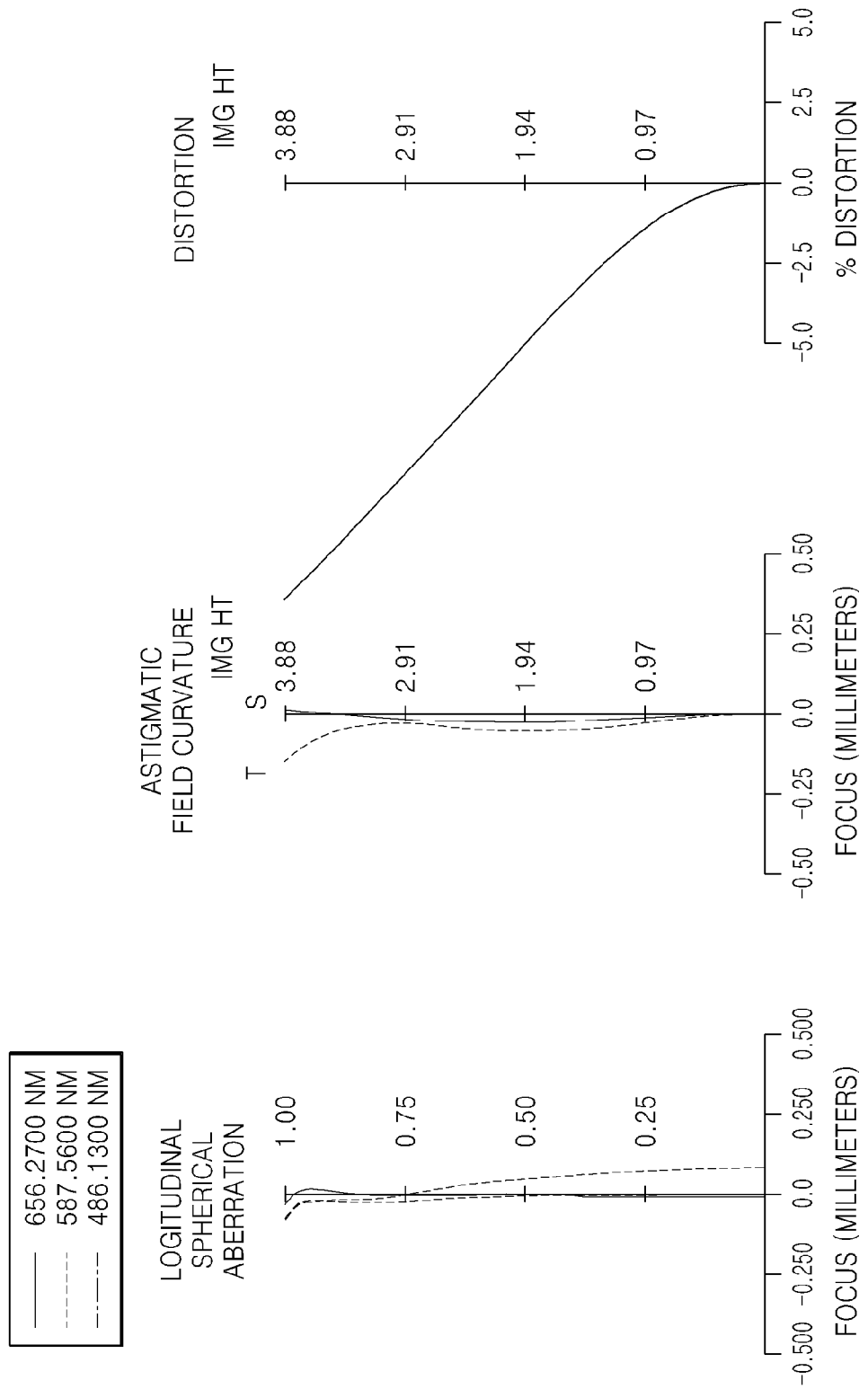

FIGS. 6A and 6B are diagrams showing spherical aberrations, astigmatic field curvatures, and distortion aberrations of a zoom lens system according to the third embodiment of FIG. 5 at a wide angle position and at a telephoto position, respectively.

Fourth Embodiment

Figure 7:
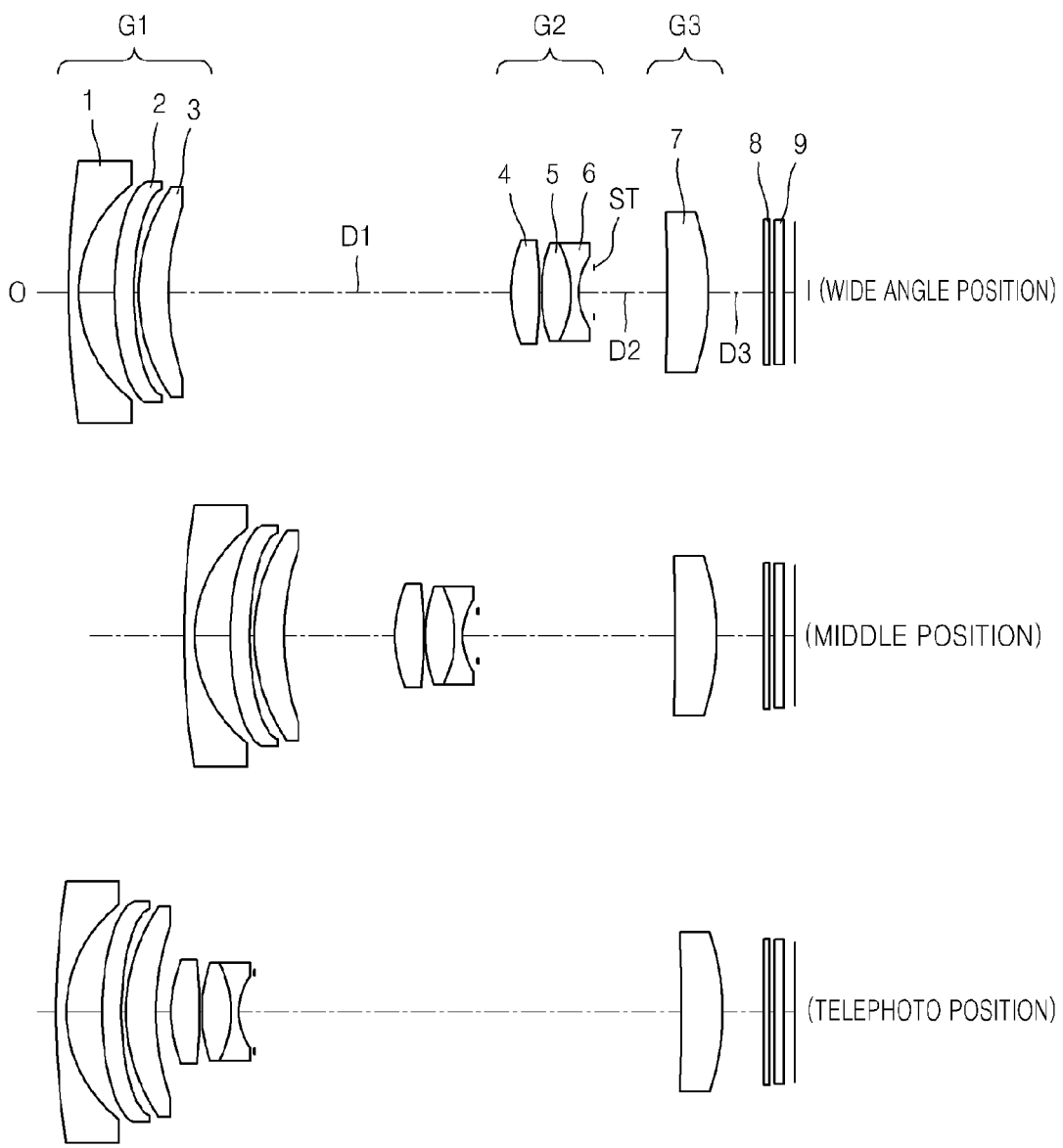
FIG. 7 is a diagram showing a zoom lens system according to a fourth embodiment.

FIG. 7 is a diagram showing a zoom lens system according to a fourth embodiment. Schematic data of the zoom lens system according to the fourth embodiment is given below in Table 7.

TABLE 7 f: 5.00~11.65~25.00
Fno: 3.58~5.75~6.08
2ω: 75.55~36.80~17.62

| Lens Surface | R (Radius of Curvature) | Dn (Thickness) | Nd | Vd |
|---|---|---|---|---|
| OBJ: | INFINITY | INFINITY | | |
| S1: | 47.76139 | 0.550000 | 1.864939 | 41.9425 |
| S2: | 7.36398 | 1.922236 | | |
| S3: | 12.85121 ASP: | 1.000000 | 1.598760 | 25.6000 |
| S4: | K: −5.014049 A: −.102685E−02 11.07071 ASP: | B: 0.411639E−04 0.300000 | C: −.210164E−06 | D: 0.613833E−08 |
| S5: | K: 1.735955 A: −.159857E−02 10.22679 | B: 0.502015E−04 1.565045 | C: −.766944E−06 1.945945 | D: 0.144372E−07 17.9843 |
| S6: | 14.54198 | D1 | | |
| S7: | 6.31512 ASP: | 1.552421 | 1.658710 | 50.0117 |
| S8: | K: −4.273009 A: 0.122683E−02 −33.59049 ASP: | B: 0.740561E−04 0.100000 | C: 0.316004E−06 | D: −.294526E−06 |
| | K: 61.063116 A: 0.217041E−03 | B: 0.490664E−05 | C: −.375006E−05 | D: −.366439E−07 |
| S9: | 7.92967 | 1.581851 | 1.850706 | 29.9462 |
| S10: | −5.65543 | 0.400000 | 1.726355 | 24.8959 |
| S11: | 3.48505 | 0.830000 | | |
| ST: | INFINITY | D2 | | |
| S13: | −80.33226 | 2.198448 | 737915.531739 | |

TABLE 7-continued f: 5.00~11.65~25.00
Fno: 3.58~5.75~6.08
2ω: 75.55~36.80~17.62

| Lens Surface | R (Radius of Curvature) | Dn (Thickness) | Nd | Vd |
|---|---|---|---|---|
| S14: | −13.46948 | D3 | | |
| S15: | INFINITY | 0.300000 | 516798.641983 | |
| S16: | INFINITY | 0.300000 | | |
| S17: | INFINITY | 0.500000 | 516798.641983 | |
| S18: | INFINITY | 0.600043 | | |
| IMG: | INFINITY | | | |

Table 8 shows data regarding distances varied during zooming operations of the zoom lens system according to the fourth embodiment.

TABLE 8

| | Wide angle position | Middle position | Telephoto position |
|---|---|---|---|
| D1 | 18.4079 | 5.9360 | 0.8 |
| D2 | 3.9873 | 10.6603 | 23.0339 |
| D3 | 2.9398 | 2.4962 | 2.1026 |

Figure 8A:
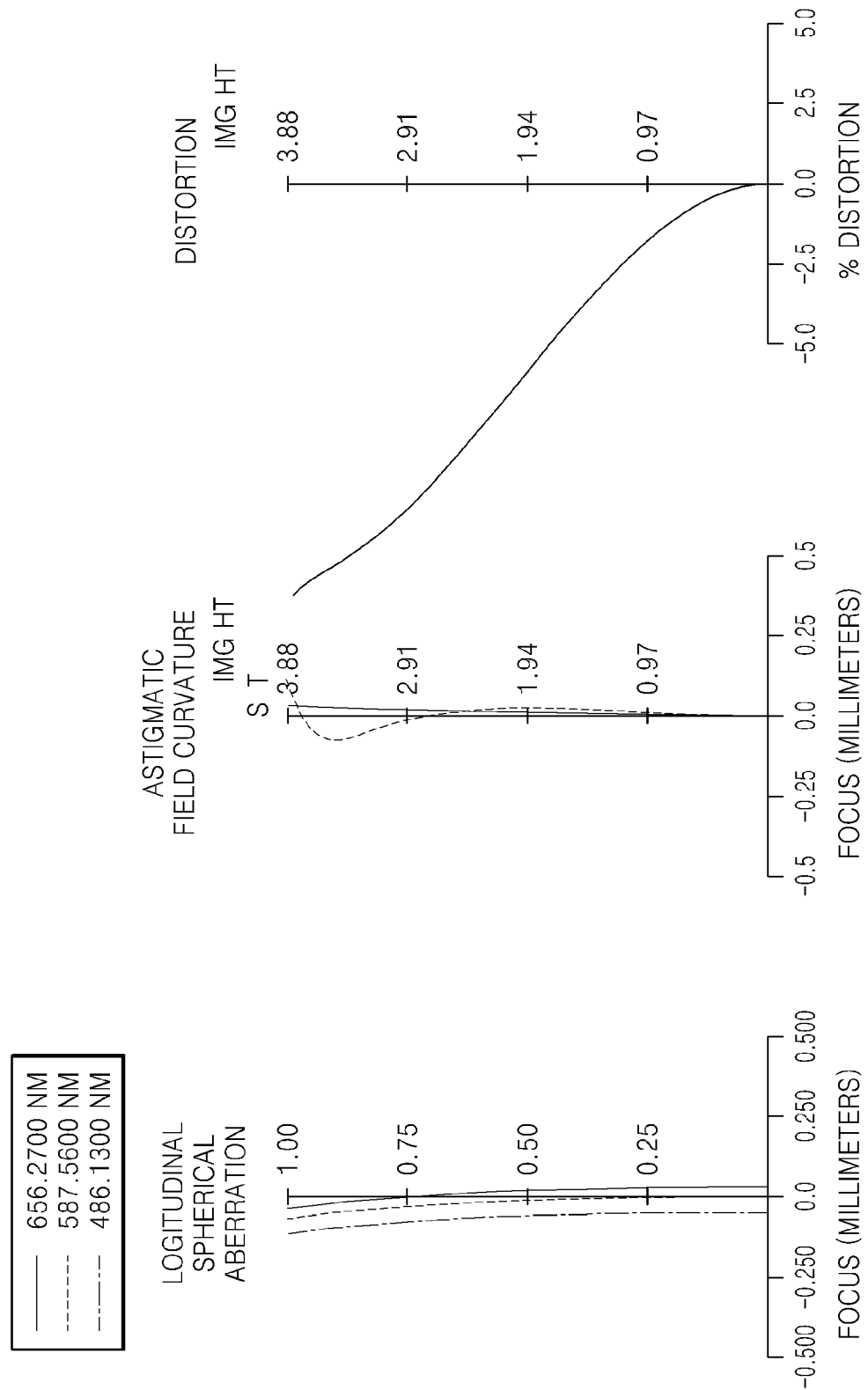
FIGS. 8A and 8B are diagrams showing spherical aberrations, astigmatic field curvatures, and distortion aberrations of a zoom lens system according to the fourth embodiment of FIG. 7 at a wide angle position and at a telephoto position, respectively.
Figure 8B:
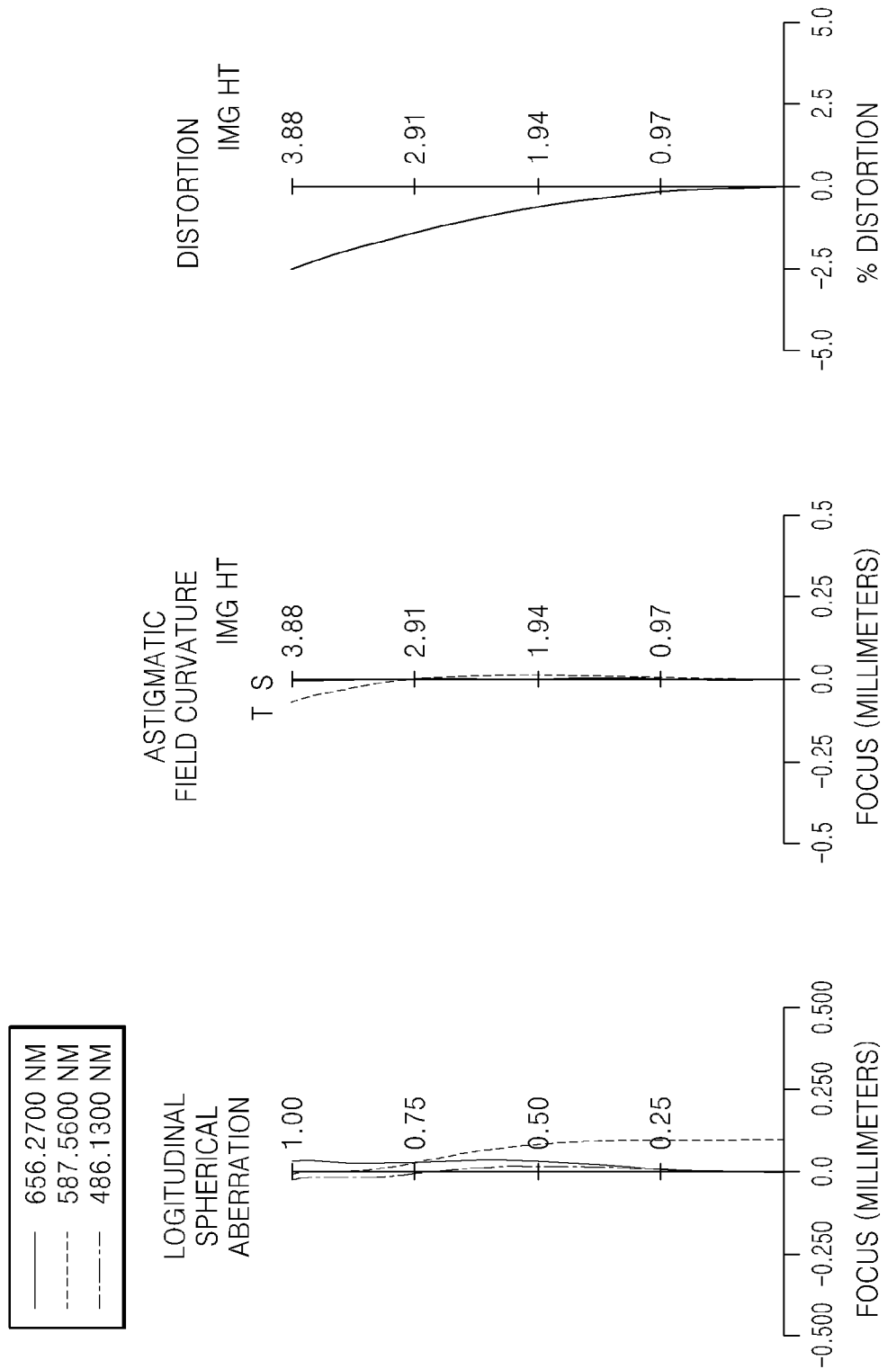

FIGS. 8A and 8B are diagrams showing spherical aberrations, astigmatic field curvatures, and distortion aberrations of a zoom lens system according to the fourth embodiment at a wide angle position and at a telephoto position, respectively.

Table 9 below shows that the zoom lens systems according to the first through fourth embodiments satisfy the Expressions 1 through 4.

TABLE 9

| | First Embodiment | Second Embodiment | Third Embodiment | Fourth Embodiment |
|---|---|---|---|---|
| Expression 1 | 0.322 | 0.313 | 0.27 | 0.319 |
| Expression 2 | 4.752 | 4.66 | 5.396 | 5 |
| Expression 3 | 1.5312 | 1.4583 | 1.4883 | 1.59876 |
| Expression 4 | −423.9 | −134 | −134 | −169 |

A zoom lens system according to various embodiments includes three lens groups G1, G2, and G3, and the first lens group G1 thereof includes an inexpensive lens. Therefore, the zoom lens system according to various embodiments may be small and inexpensive, and exhibit high magnification index.

Figure 9:
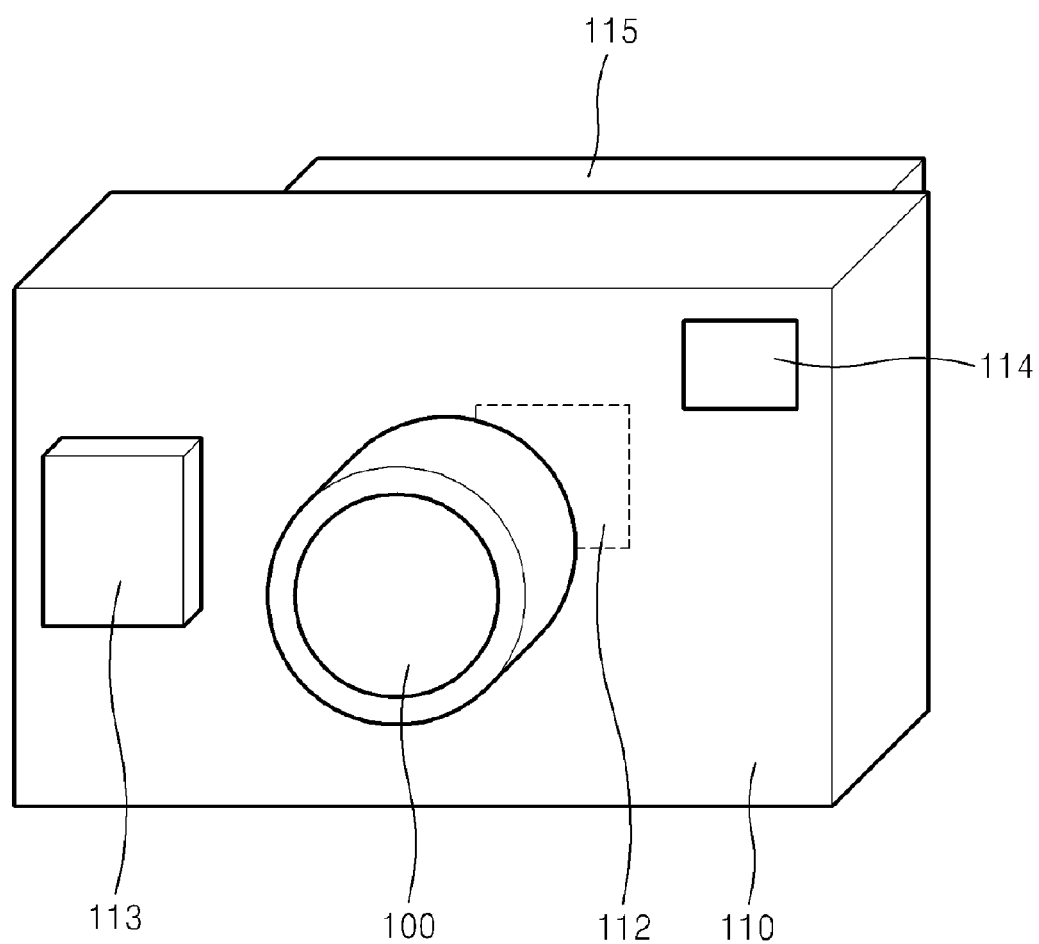
FIG. 9 is a diagram showing an imaging apparatus including the zoom lens system according to an embodiment.

FIG. 9 is a diagram showing an imaging apparatus 110 including the zoom lens system 100 according to an embodiment. The imaging apparatus 110 includes the zoom lens system 100 in accordance with the descriptions of the above embodiments and an imaging device 112 that receives light directed through the zoom lens system 100. The imaging apparatus may include a recording medium that may store data corresponding to an object image photo-electrically converted by the imaging device 112, and a viewfinder 114 for observing an object. Furthermore, the imaging apparatus 110 may include a display unit 115 on which an object image may be displayed. The imaging apparatus 110 may optionally also include a front display unit 113 on which an object image may be displayed. Although the viewfinder 114 and the display unit 115 are shown in FIG. 9 as separate components, the display unit 115 may be disposed without the viewfinder 114. The imaging apparatus shown in FIG. 9 is merely an example, and the invention is not limited thereto, and the invention may be applied to any of various optical apparatuses.

An imaging apparatus including such a zoom lens system is convenient to carry due to a small size, but is capable of capturing images of high magnification.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While a zoom lens system according to the invention and an imaging apparatus including the zoom lens system have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A zoom lens system comprising a first lens group having a negative refractive power, a second lens group having a positive refractive power, and a third lens group having a positive refractive power;

the first, second, and third lens groups being arranged sequentially from an object side;

when the zoom lens system is zoomed from a wide angle position to a telephoto position, an interval between the first lens group and the second lens group decreases and an interval between the second lens group and the third lens group increases;

the first lens group comprising a first lens, a second lens, and a third lens arranged sequentially from the object side; and the zoom lens system satisfying the following expression:

$$0.25 \leq (fw \times N2)/ft \leq 0.34,$$

wherein fw indicates a focal length of the zoom lens system at the wide angle position, ft indicates a focal length of the zoom lens system at the telephoto position, and N2 indicates a refractive index of the second lens of the first lens group.

2. The zoom lens system of claim 1, satisfying the following expressions:

$$4.6 \leq ft/fw \leq 5.4, \text{ and}$$

$$1.4 \leq N2 \leq 1.6.$$

3. The zoom lens system of claim 1, satisfying the following expression:

$$F2 \leq -100,$$

where F2 indicates a refractive power of the second lens of the first lens group.

4. The zoom lens system of claim 1, wherein the first lens of the first lens group is a spherical lens.

5. The zoom lens system of claim 1, wherein the second lens of the first lens group is an aspherical lens.

6. The zoom lens system of claim 1, wherein:
the first lens, which has a meniscus shape, is convex toward the object side, and has a negative refractive power;
the second lens, which has a meniscus shape, is convex toward the object side, and has a negative refractive power; and
the third lens, which has a meniscus shape, is convex toward the object side, and has a positive refractive power.

7. The zoom lens system of claim 1, wherein a lens arranged first from the object side of the second lens group is an aspherical lens.

8. The zoom lens system of claim 1, wherein the second lens group includes a doublet lens.

9. The zoom lens system of claim 1, wherein a stop is disposed on an image side of the second lens group.

10. The zoom lens system of claim 1, wherein the third lens group comprises only one lens.

11. The zoom lens system of claim 10, wherein the one lens of the third lens group has a meniscus shape and is convex toward an image side of the third lens group.

12. The zoom lens system of claim 1, wherein the third lens group comprises an aspherical lens having a refractive index less than or equal to 1.55.

13. The zoom lens system of claim 1, wherein the third lens group performs focusing according to movement of an image plane.

14. An imaging apparatus comprising:
a zoom lens system including a first lens group having a negative refractive power, a second lens group having a positive refractive power, and a third lens group having a positive refractive power; and
an imaging device that receives light directed through the zoom lens system;
the first, second, and third lens groups being arranged sequentially from an object side;
when zooming from a wide angle position to a telephoto position, an interval between the first lens group and the second lens group decreases and an interval between the second lens group and the third lens group increases;
the first lens group comprises a first lens, a second lens, and a third lens arranged sequentially from the object side; and
the zoom lens satisfies the following expression:

$$0.25 \leq (fw \times N2)/ft \leq 0.34,$$

wherein fw indicates a focal length of the zoom lens system at the wide angle position, ft indicates a focal length of the zoom lens system at the telephoto position, and N2 indicates a refractive index of the second lens of the first lens group.

15. The imaging apparatus of claim 14, satisfying the following expressions:

$$4.6 \leq ft/fw \leq 5.4, \text{ and}$$

$$1.4 \leq N2 \leq 1.6.$$

16. The imaging apparatus of claim 14, satisfying the following expression:

$$F2 \leq -100,$$

where F2 indicates the refractive power of the second lens of the first lens group.

17. The imaging apparatus of claim 14, wherein the first lens of the first lens group is a spherical lens.

18. The imaging apparatus of claim 14, wherein the second lens of the first lens group is an aspherical lens.

19. The imaging apparatus of claim 14, wherein a stop is disposed on an image side of the second lens group.

* * * * *